US010499366B2

(12) United States Patent
Jin et al.

(10) Patent No.: US 10,499,366 B2
(45) Date of Patent: Dec. 3, 2019

(54) PAGING METHOD AND APPARATUS FOR DISTRIBUTED GATEWAY

(71) Applicant: Huawei Technologies Co., Ltd., Shenzhen, Guangdong (CN)

(72) Inventors: Aijin Jin, Shenzhen (CN); Zhongping Chen, Shanghai (CN); Han Zhou, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/906,142

(22) Filed: Feb. 27, 2018

(65) Prior Publication Data

US 2018/0192394 A1   Jul. 5, 2018

Related U.S. Application Data

(63) Continuation of application No. PCT/CN2015/088552, filed on Aug. 31, 2015.

(51) Int. Cl.
*H04W 68/02* (2009.01)
*H04W 8/08* (2009.01)
*H04W 74/04* (2009.01)
*H04W 72/04* (2009.01)
*H04W 92/24* (2009.01)

(52) U.S. Cl.
CPC ........... *H04W 68/02* (2013.01); *H04W 8/082* (2013.01); *H04W 72/048* (2013.01); *H04W 92/24* (2013.01)

(58) Field of Classification Search
CPC .... H04W 68/02; H04W 8/082; H04W 74/048
See application file for complete search history.

(56) References Cited

U.S. PATENT DOCUMENTS

| | | | |
|---|---|---|---|
| 2011/0286465 A1 | 11/2011 | Koodli et al. | |
| 2015/0020157 A1* | 1/2015 | Kim | H04W 36/30 |
| 2016/0374095 A1 | 12/2016 | Jeon et al. | |
| 2017/0150467 A1* | 5/2017 | Tamura | H04W 60/00 |

FOREIGN PATENT DOCUMENTS

| | | |
|---|---|---|
| CN | 101001449 A | 7/2007 |
| CN | 101064923 A | 10/2007 |
| CN | 102395202 A | 3/2012 |
| EP | 3021535 A1 | 5/2016 |
| WO | 2014209007 A1 | 12/2014 |
| WO | 2015004921 A1 | 1/2015 |

\* cited by examiner

*Primary Examiner* — Ronald B Abelson
(74) *Attorney, Agent, or Firm* — Leydig, Voit & Mayer, Ltd.

(57) ABSTRACT

The present disclosure discloses a paging method and apparatus for a distributed gateway. The method includes: obtaining, by a gateway user plane, downlink data; sending downlink data report information to a gateway control plane, where the downlink data report information is used to trigger the gateway control plane to send a downlink data notification to a mobility management entity, and the downlink data notification is used to trigger the mobility management entity to initiate a paging to a terminal; obtaining downlink data channel information sent by the gateway control plane, where the downlink data channel information indicates information about a downlink data channel between a base station and the gateway user plane, and the base station is a base station to which the paged terminal belongs; and forwarding the downlink data by using the downlink data channel.

9 Claims, 5 Drawing Sheets

US 10,499,366 B2

PAGING METHOD AND APPARATUS FOR DISTRIBUTED GATEWAY

CROSS-REFERENCE TO RELATED DISCLOSURES

This application is a continuation of International Application No. PCT/CN2015/088552, filed on Aug. 31, 2015, the disclosure of which is hereby incorporated by reference in its entirety.

TECHNICAL FIELD

The present disclosure relates to the field of network communications technologies, and in particular, to a paging method and apparatus for a distributed gateway.

BACKGROUND

With continuous development of a distributed network technology, in the industry, a gateway in a mobile communications network starts to be designed as a distributed gateway (DGW).

The distributed gateway is mainly characterized by decoupling and separating a signaling control function from a data forwarding function that are of an original mobile core network gateway, and using a gateway control plane (GW-C) to bear the singling control function and a gateway user plane (GW-U) to bear the data forwarding function.

However, in a system architecture of the distributed gateway, after the gateway user plane receives a downlink data packet, because there is no interface between the gateway user plane and a mobility management entity (MME), the mobility management entity cannot be triggered to initiate a paging procedure to a terminal.

In conclusion, in the system architecture of the distributed gateway, how to initiate a paging procedure to a corresponding terminal after the gateway user plane receives a downlink data packet is an urgent problem to be resolved.

SUMMARY

In view of this, the present disclosure provides a paging method and apparatus for a distributed gateway, so that a problem of initiating a paging to a terminal is resolved by exchanging information between a gateway user plane and a gateway control plane. Specific solutions of the present disclosure are as follows:

According to a first possible implementation of a first aspect of this disclosure, this disclosure provides a paging method for a distributed gateway, and the method includes:

obtaining, by a gateway user plane, downlink data;

sending downlink data report information to a gateway control plane, where the downlink data report information is used to trigger the gateway control plane to send a downlink data notification to a mobility management entity, and the downlink data notification is used to trigger the mobility management entity to initiate a paging to a terminal;

obtaining downlink data channel information sent by the gateway control plane, where the downlink data channel information indicates information about a downlink data channel between a base station and the gateway user plane, and the base station is a base station to which the paged terminal belongs; and forwarding the downlink data by using the downlink data channel.

With reference to a second possible implementation of the first aspect, the sending downlink data report information to a gateway control plane specifically includes:

sending downlink data report information that includes the downlink data to the gateway control plane, so that the gateway control plane caches the downlink data, where the downlink data is used to trigger the gateway control plane to send the downlink data notification to the mobility management entity.

With reference to a specific implementation of the second possible implementation of the first aspect, before the forwarding the downlink data by using the downlink data channel, the method further includes:

obtaining the downlink data cached by the gateway control plane.

With reference to a fourth possible implementation of the first aspect, the sending downlink data report information to a gateway control plane specifically includes:

sending downlink data report information that includes a downlink data event identifier to the gateway control plane, where the downlink data event identifier indicates that the gateway user plane receives the downlink data.

With reference to any one of the four possible implementations of the first aspect, before the sending downlink data report information to a gateway control plane, the method further includes:

determining that a downlink forwarding resource of a bearer corresponding to the downlink data is invalid; or determining that preset action logic of a bearer corresponding to the downlink data is reporting the downlink data to the gateway control plane after receiving the downlink data.

According to a first possible implementation of a second aspect of this disclosure, this disclosure provides another paging method for a distributed gateway, and the method includes:

obtaining, by a gateway control plane, downlink data report information sent by a gateway user plane, where the downlink data report information is used to trigger the gateway control plane to send a downlink data notification to a mobility management entity, and the downlink data notification is used to trigger the mobility management entity to initiate a paging to a terminal;

sending the downlink data notification to the mobility management entity;

obtaining downlink data channel information, where the downlink data channel information indicates information about a downlink data channel between a base station and the gateway user plane, and the base station is a base station to which the paged terminal belongs; and forwarding the downlink data channel information to the gateway user plane, so that the gateway user plane forwards downlink data by using the downlink data channel.

With reference to a second possible implementation of the second aspect, the obtaining downlink data report information sent by a gateway user plane specifically includes:

obtaining downlink data report information that is sent by the gateway user plane and that includes the downlink data, where the downlink data is used to trigger the gateway control plane to send the downlink data notification to the mobility management entity; and before the sending the downlink data notification to the mobility management entity, the method further includes:

caching the downlink data.

With reference to a specific implementation of the second possible implementation of the second aspect, after the forwarding the downlink data channel information to the gateway user plane, the method further includes:

sending the cached downlink data to the gateway user plane.

With reference to a fourth possible implementation of the second aspect, the obtaining downlink data report information sent by a gateway user plane specifically includes:

obtaining downlink data report information that is sent by the gateway user plane and that includes a downlink data event identifier, where the downlink data event identifier indicates that the gateway user plane receives the downlink data.

With reference to any one of the four possible implementations of the second aspect, after the obtaining downlink data report information sent by a gateway user plane, the method further includes:

determining a priority of the paging;

determining a low-priority bearer that is for the terminal and that is in the gateway user plane, where the low-priority bearer is a bearer whose priority is lower than the priority of the paging; and sending a first downlink data report prohibition message to the gateway user plane, where the downlink data report prohibition message is used to instruct the low-priority bearer not to send the downlink data report information after receiving the downlink data.

With reference to any one of the four possible implementations of the second aspect, after the obtaining downlink data report information sent by a gateway user plane, the method further includes:

determining that the terminal has two ongoing pagings;

determining a bearer that allows sending the downlink data report information, that is for the terminal, and that is in the gateway user plane; and sending a second downlink data report prohibition message to the gateway user plane, where the downlink data report prohibition message is used to instruct the bearer that allows sending the downlink data report information not to send the downlink data report information after receiving the downlink data.

According to a first possible implementation of a third aspect of this disclosure, this disclosure provides a paging apparatus for a distributed gateway, and the apparatus includes:

an obtaining unit, configured to obtain downlink data; and a sending unit, configured to send downlink data report information to a gateway control plane, where the downlink data report information is used to trigger the gateway control plane to send a downlink data notification to a mobility management entity, and the downlink data notification is used to trigger the mobility management entity to initiate a paging to a terminal; where the obtaining unit is further configured to obtain downlink data channel information sent by the gateway control plane, where the downlink data channel information indicates information about a downlink data channel between a base station and the gateway user plane, and the base station is a base station to which the paged terminal belongs; and the sending unit is further configured to forward the downlink data by using the downlink data channel.

With reference to a second possible implementation of the third aspect, the sending unit specifically comprises:

a first downlink data report information sending subunit, configured to send downlink data report information that includes the downlink data to the gateway control plane, so that the gateway control plane caches the downlink data, where the downlink data is used to trigger the gateway control plane to send the downlink data notification to the mobility management entity.

With reference to a specific implementation of the second possible implementation of the third aspect, the obtaining unit is further configured to:

before the downlink data is forwarded by using the downlink data channel, obtain the downlink data cached by the gateway control plane.

With reference to a fourth possible implementation of the third aspect, the sending unit is specifically configured to:

send downlink data report information that includes a downlink data event identifier to the gateway control plane, where the downlink data event identifier indicates that the gateway user plane receives the downlink data.

With reference to any one of the four possible implementations of the third aspect, the apparatus further includes:

a determining unit, configured to: before the downlink data report information is sent to the gateway control plane, determine that a downlink forwarding resource of a bearer corresponding to the downlink data is invalid; or before the downlink data report information is sent to the gateway control plane, determine that preset action logic of a bearer corresponding to the downlink data is reporting the downlink data to the gateway control plane after receiving the downlink data.

According to a first possible implementation of a fourth aspect of this disclosure, this disclosure provides a paging apparatus for a distributed gateway, and the apparatus includes:

an obtaining unit, configured to obtain downlink data report information sent by a gateway user plane, where the downlink data report information is used to trigger the gateway control plane to send a downlink data notification to a mobility management entity, and the downlink data notification is used to trigger the mobility management entity to initiate a paging to a terminal; and a sending unit, configured to send the downlink data notification to the mobility management entity, where the obtaining unit is further configured to obtain downlink data channel information, where the downlink data channel information indicates information about a downlink data channel between a base station and the gateway user plane, and the base station is a base station to which the paged terminal belongs; and the sending unit is further configured to forward the downlink data channel information to the gateway user plane, so that the gateway user plane forwards downlink data by using the downlink data channel.

With reference to a second possible implementation of the fourth aspect, the obtaining unit is specifically configured to:

obtain downlink data report information that is sent by the gateway user plane and that includes the downlink data, where the downlink data is used to trigger the gateway control plane to send the downlink data notification to the mobility management entity; and the apparatus further includes:

a cache unit, configured to cache the downlink data before the downlink data notification is sent to the mobility management entity.

With reference to a specific implementation of the second possible implementation of the fourth aspect, the sending unit is further configured to:

send the cached downlink data to the gateway user plane after the downlink data channel information is forwarded to the gateway user plane.

With reference to a fourth possible implementation of the fourth aspect, the obtaining unit is specifically configured to:

obtain downlink data report information that is sent by the gateway user plane and that includes a downlink data event identifier, where the downlink data event identifier indicates that the gateway user plane receives the downlink data.

With reference to any one of the four possible implementations of the fourth aspect, the apparatus further includes:

a determining unit, configured to: after the downlink data report information sent by the gateway user plane is obtained, determine a priority of the paging; and determine a low-priority bearer that is for the terminal and that is in the gateway user plane, where the low-priority bearer is a bearer whose priority is lower than the priority of the paging, where the second unit is further configured to send a first downlink data report prohibition message to the gateway user plane, where the downlink data report prohibition message is used to instruct the low-priority bearer not to send the downlink data report information after receiving the downlink data.

With reference to any one of the four possible implementations of the fourth aspect, the apparatus further includes:

a determining unit, configured to: after the downlink data report information sent by the gateway user plane is obtained, determine that the terminal has two ongoing pagings; and determine a bearer that allows sending the downlink data report information, that is for the terminal, and that is in the gateway user plane, where the sending unit is further configured to: send a second downlink data report prohibition message to the gateway user plane, where the downlink data report prohibition message is used to instruct the bearer that allows sending the downlink data report information not to send the downlink data report information after receiving the downlink data.

It can be learned from the foregoing technical solutions that, according to the paging method and apparatus for a distributed gateway provided in this disclosure, after the gateway user plane obtains the downlink data, the gateway user plane may send the downlink data report information to the gateway control plane. After the downlink data channel information sent by the gateway control plane is obtained, the downlink data is forwarded by using the downlink data channel. Therefore, a problem of initiating a paging by a distributed gateway to a terminal is resolved.

According to the another paging method and apparatus for a distributed gateway provided in this disclosure, after the gateway control plane obtains the downlink data report information sent by the gateway user plane, the gateway control plane may send the downlink data notification to the mobility management entity. After the downlink data channel information is obtained, the downlink data channel information is forwarded to the gateway user plane. Therefore, a problem of initiating a paging by a distributed gateway to a terminal is resolved.

BRIEF DESCRIPTION OF DRAWINGS

To describe the technical solutions in the embodiments of the present disclosure more clearly, the following briefly describes the accompanying drawings required for describing the embodiments or the prior art. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

Figure 1:
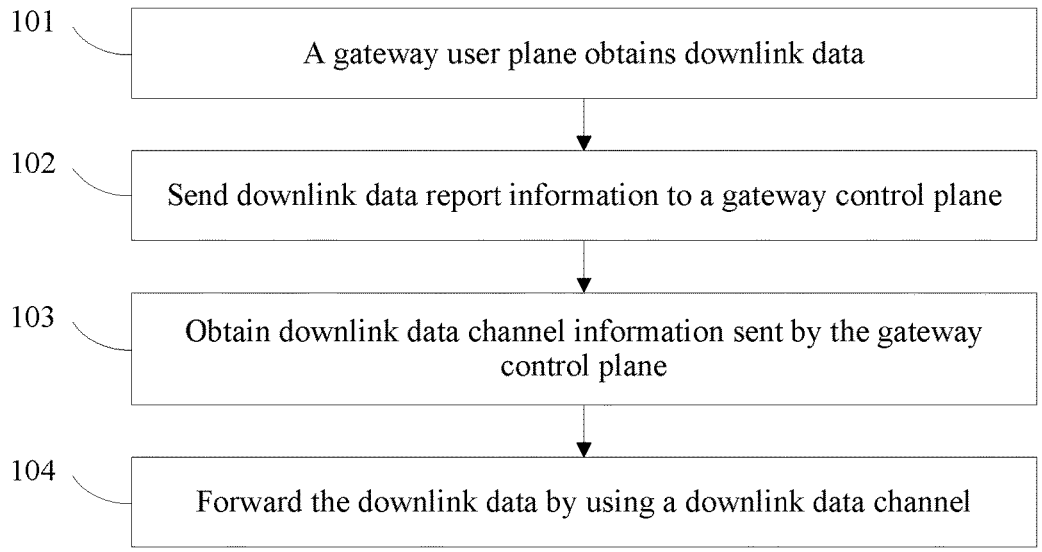
FIG. 1 is a flowchart of Embodiment 1 of a paging method for a distributed gateway according to this disclosure.

FIG. 1 is a flowchart of Embodiment 1 of a paging method for a distributed gateway according to this disclosure. As shown in FIG. 1, the method may include the following steps.

Step 101: A gateway user plane obtains downlink data.

The downlink data may be data sent by a server in a network to a terminal. The downlink data needs to be forwarded and processed by a plurality of network devices when being sent from the server to the terminal. The gateway user plane is one of the plurality of network devices.

Step 102: Send downlink data report information to a gateway control plane, where the downlink data report information is used to trigger the gateway control plane to send a downlink data notification to a mobility management entity, and the downlink data notification is used to trigger the mobility management entity to initiate a paging to a terminal.

When there is no available data channel between the gateway user plane and the terminal, or when the gateway user plane is set to send report information to the gateway control plane once the downlink data is received, the gateway user plane may send the downlink data report information to the gateway control plane.

After receiving the downlink data report information, the gateway control plane may send the downlink data notification to the mobility management entity. After receiving the downlink data notification sent by the gateway control plane, the mobility management entity may initiate a paging procedure to the terminal, and the terminal may be progressively paged by using devices such as an evolved NodeB (eNodeB).

After the terminal is paged, the terminal may initiate a service request procedure. An uplink data channel and a downlink data channel may be established between the terminal and the gateway user plane by using the service request procedure.

In a process of establishing the downlink data channel, the gateway control plane may send related information of the downlink data channel to the gateway user plane.

Step 103: Obtain downlink data channel information sent by the gateway control plane, where the downlink data channel information indicates information about a downlink data channel between a base station and the gateway user plane, and the base station is a base station to which the paged terminal belongs.

Step 104: Forward the downlink data by using the downlink data channel.

After receiving the downlink data channel information, the gateway user plane may determine to send the downlink data received in step 101 and subsequently received downlink data to the terminal by using the downlink data channel.

In conclusion, in this embodiment, after the gateway user plane obtains the downlink data, the gateway user plane may send the downlink data report information to the gateway control plane. After the downlink data channel information sent by the gateway control plane is obtained, the downlink data is forwarded by using the downlink data channel. Therefore, a problem of initiating a paging by a distributed gateway to a terminal is resolved.

Figure 2:
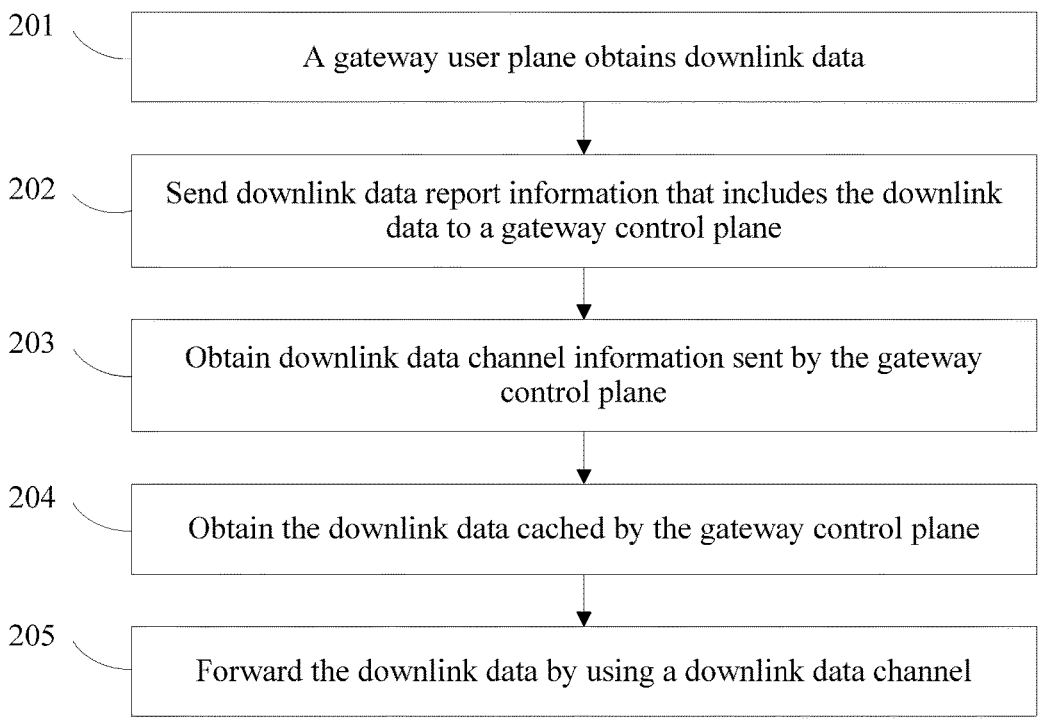
FIG. 2 is a flowchart of Embodiment 2 of a paging method for a distributed gateway according to this disclosure.

FIG. 2 is a flowchart of Embodiment 2 of a paging method for a distributed gateway according to this disclosure. As shown in FIG. 2, the method may include the following steps.

Step 201: A gateway user plane obtains downlink data.

Step 202: Send downlink data report information that includes the downlink data to a gateway control plane, so that the gateway control plane caches the downlink data, where the downlink data is used to trigger the gateway control plane to send a downlink data notification to a mobility management entity, and the downlink data notification is used to trigger the mobility management entity to initiate a paging to a terminal.

In an actual disclosure, the downlink data report information that includes the downlink data may be sent to the gateway control plane by using a data channel, or may be sent to the gateway control plane by using a signaling channel. If the downlink data report information is sent by using a data channel, upon receiving the downlink data report information, the gateway control plane may locally decide to trigger a paging. If the data channel is a paging channel specially used for forwarding the downlink data used for a paging, the gateway control plane may determine, according to a channel feature, that the downlink data is used to trigger the paging. If the paging channel is based on a GPRS tunneling protocol user plane (GTPU), the channel feature is a GTPU tunnel endpoint identifier (TEID). If the downlink data report information is sent by using a signaling channel, the gateway user plane may add data packet indication information into the to-be-sent downlink data report information. The gateway control plane may learn, according to the indication information, that a user data packet is sent. When receiving the downlink data report information, the gateway control plane may locally decide to trigger a paging. Further, the gateway user plane may add a paging identifier into the downlink data report information, so that the gateway control plane may learn, according to the paging identifier, that the downlink data report information is used to trigger a paging.

Step 203: Obtain downlink data channel information sent by the gateway control plane, where the downlink data channel information indicates information about a downlink data channel between the paged terminal and the gateway user plane.

Step 204: Obtain the downlink data cached by the gateway control plane.

Step 205: Forward the downlink data by using the downlink data channel.

In this embodiment, the downlink data report information includes the downlink data. After receiving the downlink data report information, the gateway control plane may cache the downlink data included in the downlink data report information.

After the downlink data channel is established, the gateway control plane may send the cached downlink data to the gateway user plane. After obtaining the downlink data sent by the gateway control plane, the gateway user plane sends the downlink data to the terminal by using the downlink data channel.

In this embodiment, the downlink data is cached to the gateway control plane, so as to reduce caching load of the gateway user plane, and ensure that the downlink data is not lost.

It should be noted that, in another embodiment of the present disclosure, the downlink data report information may not include the downlink data. The downlink data may be cached on the gateway user plane, so as to reduce caching load of the gateway control plane.

When the downlink data report information does not include the downlink data, the downlink data report information may include a downlink data event identifier. The downlink data event identifier indicates that the gateway user plane receives the downlink data. The downlink data event identifier may be transmitted to the gateway control plane by using a signaling channel. In an actual disclosure, the downlink data event identifier may be specifically paging indication information or a specific message name type (for example, a paging report).

Figure 3:
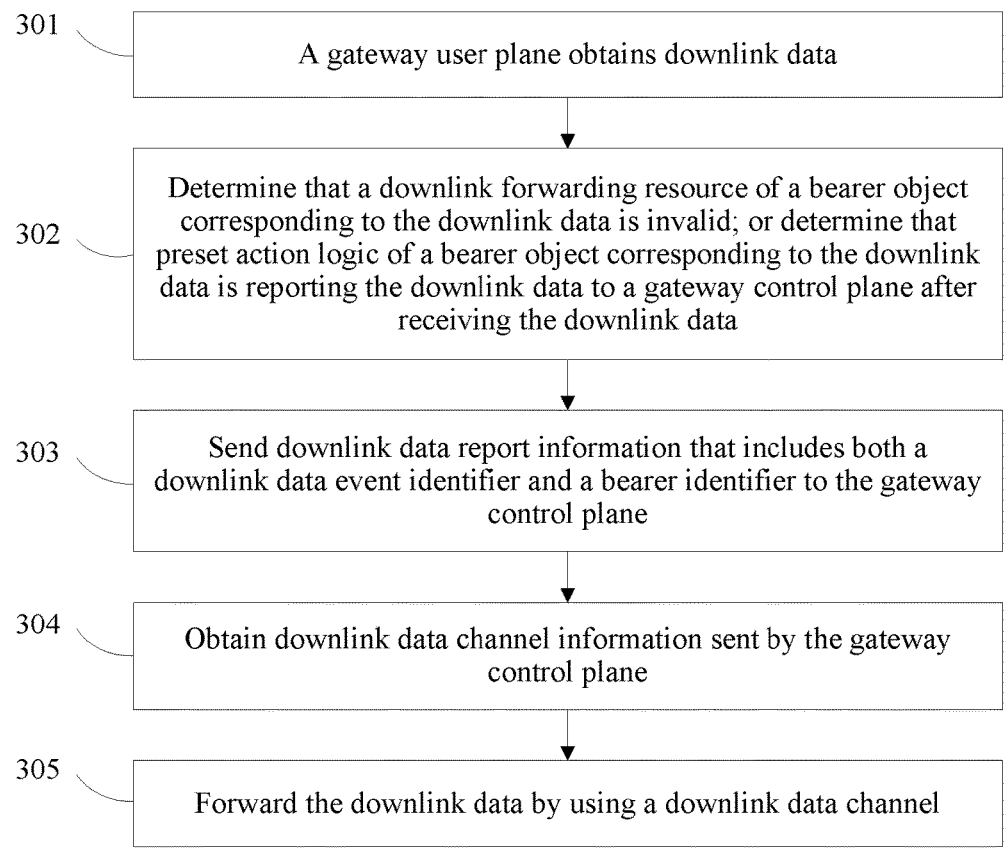
FIG. 3 is a flowchart of Embodiment 3 of a paging method for a distributed gateway according to this disclosure.

FIG. 3 is a flowchart of Embodiment 3 of a paging method for a distributed gateway according to this disclosure. As shown in FIG. 3, the method may include the following steps.

Step 301: A gateway user plane obtains downlink data.

Step 302: Determine that a downlink forwarding resource of a bearer corresponding to the downlink data is invalid; or determine that preset action logic of a bearer corresponding to the downlink data is reporting the downlink data to the gateway control plane after receiving the downlink data.

Each user may have a corresponding bearer on the gateway user plane. The bearer is used to complete actions such as data forwarding of the terminal. Interface information used when the bearer forwards the downlink data may be recorded in attribute information of the bearer. If the interface information is set to be available, it indicates that after receiving the downlink data, the bearer may forward the downlink data by using a corresponding interface. If the interface information is set to be unavailable, it indicates that the downlink forwarding resource of the bearer is invalid. In this case, the downlink data report information needs to be sent to the gateway control plane.

Alternatively, in an S1 release procedure, the gateway control plane may preset an action of the bearer, to set the action of the bearer to sending the downlink data report information to the gateway control plane after receiving the downlink data. In this case, after receiving the downlink data, the bearer directly sends the downlink data report information to the gateway control plane.

In this embodiment, the gateway user plane may use an object-oriented implementation method to abstract a forwarding plane into multiple objects, to provide a service for a terminal in an object manner. For example, a bearer in the gateway user plane for forwarding and processing downlink data may be implemented as a bearer object. Each Bearer object may have a corresponding attribute or an arranged action.

An object-oriented implementation method is used to abstract a data forwarding unit in the gateway user plane into a bearer object, to provide a service in the object manner. This implementation is relatively flexible, and can present programmability of the gateway user plane.

Step 303: Send downlink data report information that includes both a downlink data event identifier and a bearer identifier to the gateway control plane, where the downlink data event identifier indicates that the bearer receives the downlink data, the bearer identifier is used to identify the bearer. The downlink data report information is used to trigger the gateway control plane to send a downlink data notification to a mobility management entity, and the downlink data notification is used to trigger the mobility management entity to initiate a paging to the terminal.

After receiving the bearer identifier, the control gateway may determine a paging priority of the bearer according to the bearer identifier.

It should be noted that, if the bearer is implemented in the object manner, the bearer identifier may be a bearer object identifier.

Step 304: Obtain downlink data channel information sent by the gateway control plane, where the downlink data channel information indicates information about a downlink data channel between the paged terminal and the gateway user plane.

Step 305: Forward the downlink data by using the downlink data channel.

Figure 4:
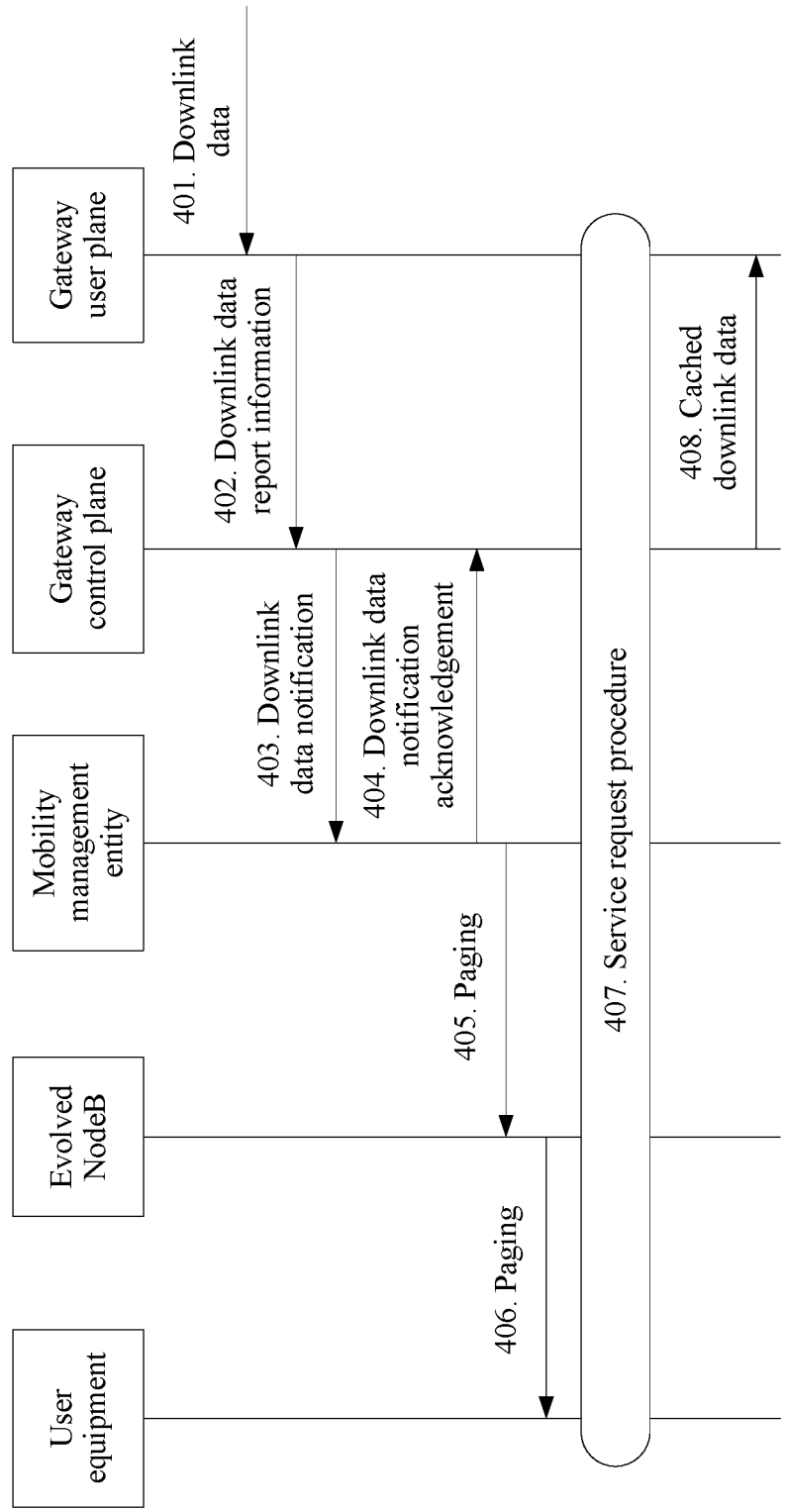
FIG. 4 is a signaling diagram of an embodiment of a paging method for a distributed gateway according to this disclosure.

FIG. 4 is a signaling diagram of an embodiment of a paging method for a distributed gateway according to this disclosure. As shown in FIG. 4, the method may include the following steps.

Step 401: A gateway user plane receives downlink data sent by an immediate-upper-level device (such as a server).

When determining that a downlink forwarding resource corresponding to the downlink data is invalid, or determining that preset action logic of a bearer corresponding to the downlink data is reporting the downlink data to a gateway control plane after receiving the downlink data, the gateway user plane sends downlink data report information to the gateway control plane.

Step 402: The gateway user plane sends downlink data report information to a gateway control plane.

The downlink data report information may include the downlink data received by the gateway user plane. If the downlink data report information includes the downlink data, the gateway control plane caches the downlink data after receiving the downlink data.

Step 403: The gateway control plane sends a downlink data notification (DDN) to a mobility management entity.

The gateway control plane may determine, according to a policy, whether to send the downlink data notification. For example, the policy may be triggering a maximum of two pagings for same user equipment or a same terminal at a same time. A paging is scheduled according to a priority. When a priority of an ongoing paging is relatively high and a second paging needs to be triggered for the downlink data, the second paging is not triggered if a priority of the second paging is lower.

Step 404: The mobility management entity feeds back downlink data notification acknowledgement information to the gateway control plane.

The mobility management entity may determine, according to a policy set by the mobility management entity, whether to initiate a paging to a user equipment (UE) or a terminal. If the mobility management entity determines to initiate a paging, the mobility management entity feeds back the downlink data notification acknowledgement information to the gateway control plane.

Step 405: The mobility management entity sends a paging message to an evolved NodeB.

The paging message sent by the mobility management entity is used to instruct the evolved NodeB to initiate a paging to the user equipment.

Step 406: The evolved NodeB sends the paging message to a user equipment.

Step 407: After receiving the paging message, the user equipment progressively initiates a service request to the gateway user plane by using devices such as the evolved NodeB, the mobility management entity, and the gateway control plane.

In a procedure of initiating a service request, a downlink data channel between the user equipment and the gateway user plane may be established or restored. In addition, the gateway control plane may send the downlink data channel information to the gateway user plane in the procedure, so that the gateway user plane may learn a downlink channel used to forward the downlink data.

It should be noted that, if the downlink data report information sent by the gateway user plane to the gateway control plane includes the downlink data received by the gateway user plane, the method may further include an optional step 408.

Step 408: The gateway control plane sends cached downlink data to the gateway user plane.

After receiving the downlink data, the gateway user plane may forward the downlink data to the user equipment by using the downlink data channel. This can ensure that the downlink data received in step 401 is not lost.

This disclosure further provides another paging method for a distributed gateway. The another paging method for a distributed gateway may be executed by a gateway control plane.

Figure 5:
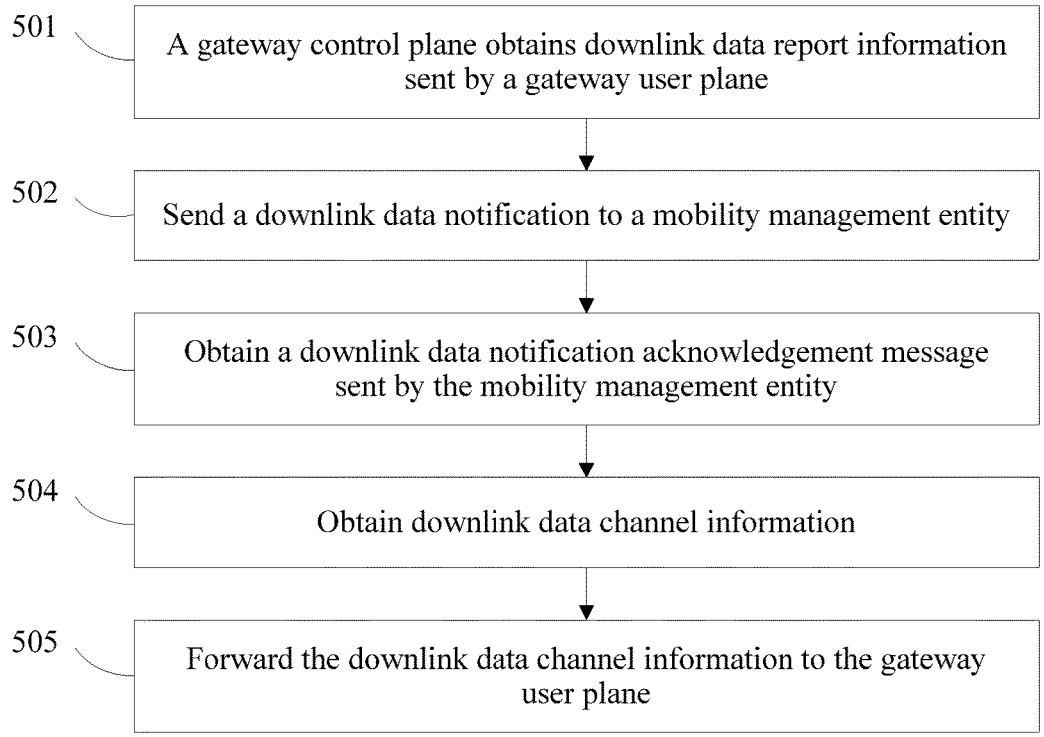
FIG. 5 is a flowchart of an embodiment of a paging method for a distributed gateway according to this disclosure.

FIG. 5 is a flowchart of an embodiment of a paging method for a distributed gateway according to this disclosure. As shown in FIG. 5, the method may include the following steps.

Step 501: The gateway control plane obtains downlink data report information sent by a gateway user plane, where the downlink data report information is used to trigger the gateway control plane to send a downlink data notification to a mobility management entity, and the downlink data notification is used to trigger the mobility management entity to initiate a paging to a terminal.

Step 502: Send the downlink data notification to the mobility management entity.

In an actual disclosure, the mobility management entity obtains the downlink data notification, and may determine, based on a related policy, whether paging initiation is allowed. If determining that paging initiation is allowed, the mobility management entity may send a downlink data notification acknowledgement message to the gateway control plane. The gateway control plane may obtain the downlink data notification acknowledgement message sent by the mobility management entity. The downlink data notification acknowledgement message indicates that the mobility management entity determines to initiate a paging to the terminal.

Step 503: Obtain downlink data channel information, where the downlink data channel information indicates information about a downlink data channel between a base station and the gateway user plane, and the base station is a base station to which the paged terminal belongs.

The downlink data channel information may be sent by the mobility management entity to the gateway control plane. The downlink data channel information may be specifically channel endpoint information on a base station side.

Step 504: Forward the downlink data channel information to the gateway user plane, so that the gateway user plane forwards downlink data by using the downlink data channel.

In this embodiment, after the gateway control plane obtains the downlink data report information sent by the gateway user plane, the gateway control plane may send the downlink data notification to the mobility management entity. After the downlink data channel information is obtained, the downlink data channel information is forwarded to the gateway user plane. Therefore, a problem of initiating a paging by a distributed gateway to a terminal is resolved.

In an actual disclosure, the obtaining downlink data report information sent by a gateway user plane may specifically include:

obtaining downlink data report information that is sent by the gateway user plane and that includes the downlink data, where the downlink data is used to trigger the gateway control plane to send the downlink data notification to the mobility management entity.

Before the sending a downlink data notification to a mobility management entity, the method may further include:

caching the downlink data.

In an actual disclosure, after the forwarding the downlink data channel information to the gateway user plane, the method may further include:

sending the cached downlink data to the gateway user plane.

In an actual disclosure, the obtaining downlink data report information sent by a gateway user plane may specifically include:

obtaining downlink data report information that is sent by the gateway user plane and that includes a downlink data event identifier.

The downlink data event identifier indicates that the gateway user plane receives the downlink data.

It should be further noted that, in this embodiment of the present disclosure, the gateway control plane may determine, according to a policy, whether to send the downlink data notification. For example, the policy may be triggering a maximum of two pagings for same user equipment or a same terminal at a same time. A paging is scheduled according to a priority. When a priority of an ongoing paging is relatively high and a second paging needs to be triggered for the downlink data, the second paging is not triggered if a priority of the second paging is lower.

To implement the foregoing policy, in an actual disclosure, after the obtaining downlink data report information sent by a gateway user plane, the method may further include the following steps:

determining a priority of the paging;

determining a low-priority bearer that is for the terminal and that is in the gateway user plane, where the low-priority bearer is a bearer whose priority is lower than the priority of the paging; and sending a first downlink data report prohibition message to the gateway user plane, where the downlink data report prohibition message is used to instruct the low-priority bearer not to send the downlink data report information after receiving the downlink data.

In the foregoing steps, the priority of the paging may be obtained in a plurality of manners. For example, the priority of the paging may be corresponding to a bearer identifier of the bearer, and a correspondence may be pre-stored on the gateway control plane. Specifically, the bearer identifier may have a corresponding context. The context may include priority information of the bearer. After obtaining the bearer identifier, the gateway control plane may determine the priority information according to the bearer identifier, and determine the priority of the paging according to the priority information. Alternatively, a paging trigger message received by the gateway control plane may directly include the priority information of the paging. In this way, the gateway control plane may directly determine the priority of the paging according to the paging trigger message.

The foregoing steps may ensure that when a priority of an ongoing paging is relatively high and a second paging needs to be triggered for the downlink data, the second paging is not triggered if a priority of the second paging is lower.

In an actual disclosure, after the obtaining downlink data report information sent by a gateway user plane, the method may further include the following steps:

determining that the terminal has two ongoing pagings;

determining a bearer that allows sending the downlink data report information, that is for the terminal, and that is in the gateway user plane; and sending a second downlink data report prohibition message to the gateway user plane, where the downlink data report prohibition message is used to instruct the bearer that allows sending the downlink data report information not to send the downlink data report information after receiving the downlink data.

The foregoing steps may ensure that a maximum of two pagings are triggered for same user equipment or a same terminal at a same time.

This disclosure further provides a paging apparatus for a distributed gateway. The paging apparatus may be a gateway user plane.

Figure 6:
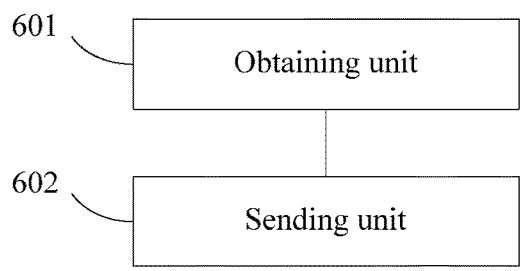
FIG. 6 is a structural diagram of an embodiment of a paging apparatus for a distributed gateway according to this disclosure.

FIG. 6 is a structural diagram of an embodiment of a paging apparatus for a distributed gateway according to this disclosure. As shown in FIG. 6, the apparatus may include an obtaining unit 601 and a sending unit 602.

The obtaining unit 601 is configured to obtain downlink data.

The downlink data may be data sent by a server in a network to a terminal. The downlink data needs to be forwarded and processed by a plurality of network devices when being sent from the server to the terminal. The gateway user plane is one of the plurality of network devices.

The sending unit 602 is configured to send downlink data report information to a gateway control plane. The downlink data report information is used to trigger the gateway control plane to send a downlink data notification to a mobility management entity, and the downlink data notification is used to trigger the mobility management entity to initiate a paging to a terminal.

When there is no available data channel between the gateway user plane and the terminal, or when the gateway user plane is set to send report information to the gateway control plane once the downlink data is received, the gateway user plane may send the downlink data report information to the gateway control plane.

After receiving the downlink data report information, the gateway control plane may send the downlink data notification to the mobility management entity. After receiving the downlink data notification sent by the gateway control plane, the mobility management entity may initiate a paging procedure to the terminal, and the terminal may be progressively paged by using devices such as an eNodeB.

After the terminal is paged, the terminal may initiate a service request procedure. An uplink data channel and a downlink data channel may be established between the terminal and the gateway user plane by using the service request procedure.

In a process of establishing the downlink data channel, the gateway control plane may send related information of the downlink data channel to the gateway user plane.

The obtaining unit 601 is further configured to obtain downlink data channel information sent by the gateway control plane, where the downlink data channel information indicates information about a downlink data channel between a base station and the gateway user plane, and the base station is a base station to which the paged terminal belongs.

The sending unit 602 is further configured to forward the downlink data by using the downlink data channel.

After receiving the downlink data channel information, the gateway user plane may determine to send the downlink data and subsequently received downlink data to the terminal by using the downlink data channel.

In conclusion, in this embodiment, after the gateway user plane obtains the downlink data, the gateway user plane may send the downlink data report information to the gateway control plane. After the downlink data channel information sent by the gateway control plane is obtained, the downlink data is forwarded by using the downlink data channel. Therefore, a problem of initiating a paging by a distributed gateway to a terminal is resolved.

In an actual disclosure, the sending unit 602 may be specifically configured to:

send downlink data report information that includes the downlink data to the gateway control plane, so that the gateway control plane caches the downlink data, where the downlink data is used to trigger the gateway control plane to send the downlink data notification to the mobility management entity.

In an actual disclosure, the obtaining unit 601 may further be configured to:

before the downlink data is forwarded by using the downlink data channel, obtain the downlink data cached by the gateway control plane.

In an actual disclosure, the sending unit 602 may be specifically configured to:

send downlink data report information that includes a downlink data event identifier to the gateway control plane. The downlink data event identifier indicates that the gateway user plane receives the downlink data.

In an actual disclosure, the apparatus may further include:

a determining unit, configured to: before the downlink data report information is sent to the gateway control plane, determine that a downlink forwarding resource of a bearer corresponding to the downlink data is invalid; or before the downlink data report information is sent to the gateway control plane, determine that preset action logic of a bearer corresponding to the downlink data is reporting the downlink data to the gateway control plane after receiving the downlink data.

This disclosure further provides another paging apparatus for a distributed gateway. The paging apparatus may be a gateway control plane.

Figure 7:
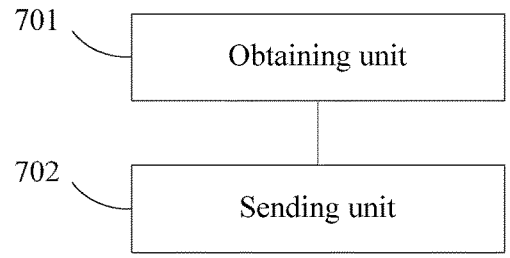
FIG. 7 is a structural diagram of an embodiment of a paging apparatus for a distributed gateway according to this disclosure.

FIG. 7 is a structural diagram of an embodiment of a paging apparatus for a distributed gateway according to this disclosure. As shown in FIG. 7, the apparatus may include:

an obtaining unit 701, configured to obtain downlink data report information sent by a gateway user plane, where the downlink data report information is used to trigger the gateway control plane to send a downlink data notification to a mobility management entity, and the downlink data notification is used to trigger the mobility management entity to initiate a paging to a terminal; and a sending unit 702, configured to send the downlink data notification to the mobility management entity.

In an actual disclosure, the mobility management entity obtains the downlink data notification, and may determine, based on a related policy, whether paging initiation is allowed. If determining that paging initiation is allowed, the mobility management entity may send a downlink data notification acknowledgement message to the gateway control plane. The gateway control plane may obtain the downlink data notification acknowledgement message sent by the mobility management entity. The downlink data notification acknowledgement message indicates that the mobility management entity determines to initiate a paging to the terminal.

The obtaining unit 701 is further configured to obtain downlink data channel information, where the downlink data channel information indicates information about a downlink data channel between abase station and the gateway user plane, and the base station is a base station to which the paged terminal belongs.

The downlink data channel information may be sent by the mobility management entity to the gateway control plane. The downlink data channel information may be specifically channel endpoint information on a base station side.

The sending unit 702 is further configured to forward the downlink data channel information to the gateway user plane, so that the gateway user plane forwards downlink data by using the downlink data channel.

In this embodiment, after the gateway control plane obtains the downlink data report information sent by the gateway user plane, the gateway control plane may send the downlink data notification to the mobility management entity. After the downlink data channel information is obtained, the downlink data channel information is forwarded to the gateway user plane. Therefore, a problem of initiating a paging by a distributed gateway to a terminal is resolved.

In an actual disclosure, the obtaining unit 701 is specifically configured to:

obtain downlink data report information that is sent by the gateway user plane and that includes the downlink data, where the downlink data is used to trigger the gateway control plane to send the downlink data notification to the mobility management entity.

The apparatus further includes:

a cache unit, configured to cache the downlink data before the downlink data notification is sent to the mobility management entity.

In an actual disclosure, the sending unit 702 is further configured to:

send the cached downlink data to the gateway user plane after the downlink data channel information is forwarded to the gateway user plane.

In an actual disclosure, the obtaining unit 701 is specifically configured to:

obtain downlink data report information that is sent by the gateway user plane and that includes a downlink data event identifier.

The downlink data event identifier indicates that the gateway user plane receives the downlink data.

In an actual disclosure, the apparatus may further include:

a determining unit, configured to: after the downlink data report information sent by the gateway user plane is obtained, determine a priority of the paging; and determine a low-priority bearer that is for the terminal and that is in the gateway user plane, where the low-priority bearer is a bearer whose priority is lower than the priority of the paging.

The second unit 702 is further configured to send a first downlink data report prohibition message to the gateway user plane, where the downlink data report prohibition message is used to instruct the low-priority bearer not to send the downlink data report information after receiving the downlink data.

In an actual disclosure, the apparatus may further include:

a determining unit, configured to: after the downlink data report information sent by the gateway user plane is obtained, determine that the terminal has two ongoing pagings; and determine a bearer that allows sending the downlink data report information, that is for the terminal, and that is in the gateway user plane.

The sending unit 702 is further configured to: send a second downlink data report prohibition message to the gateway user plane, where the downlink data report prohibition message is used to instruct the bearer that allows sending the downlink data report information not to send the downlink data report information after receiving the downlink data.

In addition, an embodiment of this disclosure further provides a computing node. The computing node may be a host server that has a computing capability, a personal computer PC, a portable computer or terminal, or the like. A specific embodiment of this disclosure constitutes no limitation on a specific implementation of the computing node.

Figure 8:
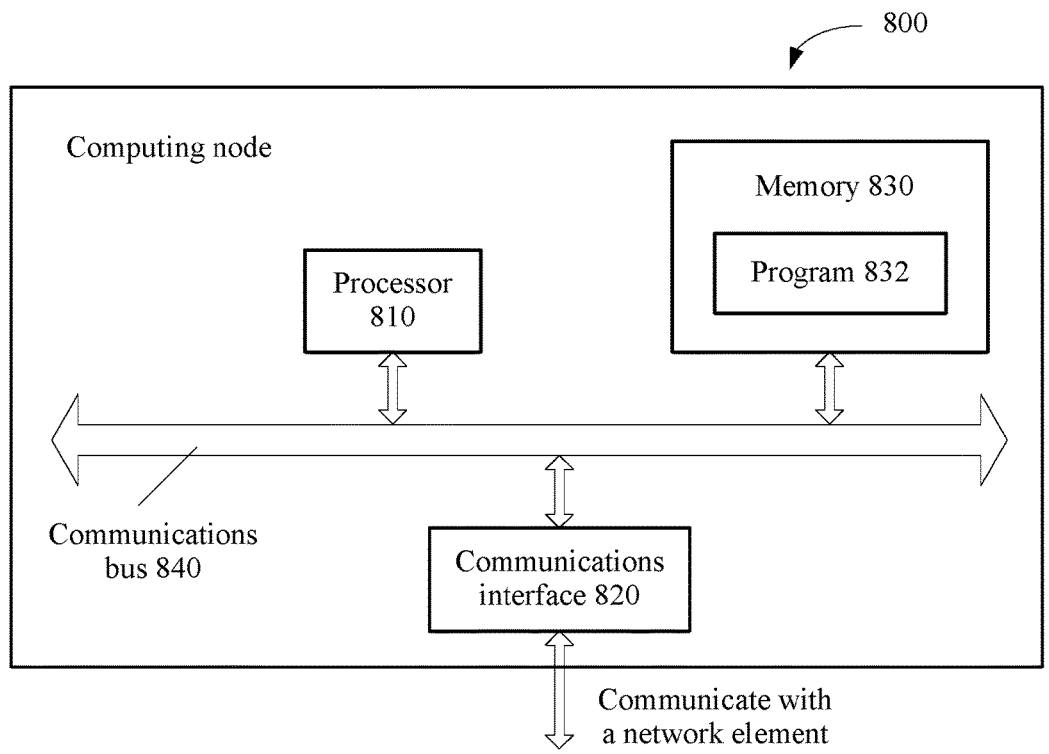
FIG. 8 is a structural diagram of a computing node according to this disclosure.

FIG. 8 is a structural diagram of a computing node according to this disclosure. As shown in FIG. 8, the computing node 800 includes:

a processor 810, a communications interface 820, a memory 830, and a bus 840.

The processor 810, the communications interface 820, and the memory 830 complete communication with each other by using the bus 840.

The processor 810 is configured to execute a program 832.

Specifically, the program 832 may include program code, and the program code includes a computer operation instruction.

The processor 810 may be a central processing unit CPU, or an disclosure-specific integrated circuit (ASIC), or one or more integrated circuits configured to implement this embodiment of this disclosure.

The memory 830 is configured to store the program 832. The memory 830 may include a high-speed RAM, or may include a nonvolatile memory such as at least one magnetic disk storage. The program 832 may include corresponding units in the embodiments shown in FIG. 6 and FIG. 7, and details are not described herein again.

The embodiments in this specification are all described in a progressive manner, for same or similar parts in the embodiments, reference may be made to these embodiments, and each embodiment focuses on a difference from other embodiments. The apparatus disclosed in the embodiments is described relatively simply because it corresponds to the method disclosed in the embodiments, and for portions related to those of the method, reference may be made to the description of the method.

A person skilled in the art may further be aware that, in combination with the examples described in the embodiments disclosed in this specification, units and algorithm steps may be implemented by electronic hardware or a combination of computer software and electronic hardware. To clearly describe the interchangeability between the hardware and the software, the foregoing has generally described compositions and steps of each example according to functions. Whether the functions are performed by hardware or software and hardware depends on particular disclosures and design constraint conditions of the technical solutions. A person skilled in the art may use different methods to implement the described functions for each particular disclosure, but it should not be considered that the implementation goes beyond the scope of the present disclosure.

In combination with the embodiments disclosed in this specification, method or algorithm steps may be implemented by hardware, a software module executed by a processor, or a combination thereof. The software module may reside in a random access memory (RAM), a memory, a read-only memory (ROM), an electrically programmable ROM, an electrically erasable programmable ROM, a register, a hard disk, a removable disk, a CD-ROM, or any other form of storage medium known in the art.

The embodiments disclosed above are described to enable a person skilled in the art to implement or use the present disclosure. Various modifications to the embodiments are obvious to the person skilled in the art, and general principles defined in this specification may be implemented in other embodiments without departing from the spirit or scope of the present disclosure. Therefore, the present disclosure will not be limited to the embodiments described in this specification but extends to the widest scope that complies with the principles and novelty disclosed in this specification.

What is claimed is:

1. A paging method for a distributed gateway, the method comprising:

obtaining, by a gateway user plane, downlink data;

sending, by the gateway user plane, downlink data report information to a gateway control plane for triggering the gateway control plane to send a downlink data notification to a mobility management entity, the downlink data notification for triggering the mobility management entity to initiate a paging to a terminal;

obtaining, by the gateway user plane, downlink data channel information from the gateway control plane, wherein the downlink data channel information indicates information about a downlink data channel between a base station and the gateway user plane, and wherein the base station is a base station to which the paged terminal belongs; and forwarding, by the gateway user plane, the downlink data by using the downlink data channel; wherein the downlink data report information comprises a downlink data event identifier for indicating that the gateway user plane received the downlink data.

2. The method according to claim 1, wherein before sending the downlink data report information, the method further comprises:

determining that a downlink forwarding resource of a bearer corresponding to the downlink data is invalid.

3. The method according to claim 1, wherein before sending the downlink data report information, the method further comprises:

determining that preset action logic of a bearer corresponding to the downlink data is reporting the event of the downlink data to the gateway control plane after receiving the downlink data.

4. A paging apparatus for a distributed gateway, the paging apparatus comprising:

a receiver, configured to obtain downlink data;

a transmitter, configured to send downlink data report information to a gateway control plane for triggering the gateway control plane to send a downlink data notification to a mobility management entity, the downlink data notification for triggering the mobility management entity to initiate a paging to a terminal;

wherein the receiver is further configured to obtain downlink data channel information from the gateway control plane, wherein the downlink data channel information indicates information about a downlink data channel between a base station and a gateway user plane, and wherein the base station is a base station to which the paged terminal belongs; and wherein the transmitter is further configured to forward the downlink data by using the downlink data channel, and the downlink data report information comprises a downlink data event identifier for indicating that the gateway user plane received the downlink data.

5. The apparatus according to claim 4, further comprising: a processor, configured to:

before the downlink data report information is sent to the gateway control plane, determine that a downlink forwarding resource of a bearer corresponding to the downlink data is invalid.

6. The apparatus according to claim 4, further comprising: a processor, configured to:

before the downlink data report information is sent to the gateway control plane, determine that preset action logic of a bearer corresponding to the downlink data is reporting the event of the downlink data to the gateway control plane after receiving the downlink data.

7. A non-transitory computer-readable medium storing computer instructions for execution by one or more processors, wherein the computer instructions, when executed by the one or more processors, facilitate:

obtaining downlink data;

sending downlink data report information to a gateway control plane for triggering the gateway control plane to send a downlink data notification to a mobility management entity, the downlink data notification for triggering the mobility management entity to initiate a paging to a terminal;

obtaining downlink data channel information from the gateway control plane, wherein the downlink data channel information indicates information about a downlink data channel between a base station and a gateway user plane, and wherein the base station is a base station to which the paged terminal belongs; and forwarding the downlink data by using the downlink data channel;

wherein the downlink data report information comprises a downlink data event identifier for indicating that the gateway user plane received the downlink data.

8. The non-transitory computer-readable medium according to claim 7, wherein the computer instructions, when executed by the one or more processors, further facilitate:

determining that a downlink forwarding resource of a bearer corresponding to the downlink data is invalid.

9. The non-transitory computer-readable medium according to claim 7, wherein the computer instructions, when executed by the one or more processors, further facilitate:

determining that preset action logic of a bearer corresponding to the downlink data is reporting the event of the downlink data to the gateway control plane after receiving the downlink data.

* * * * *